United States Patent

[11] 3,592,383

[72] Inventor Carl G. Ringwall
Scotia, N.Y.
[21] Appl. No. 32,990
[22] Filed Apr. 29, 1970
[45] Patented July 13, 1971
[73] Assignee General Electric Company

[54] FLUIDIC RESET INTEGRATOR CIRCUIT
12 Claims, 2 Drawing Figs.

[52] U.S. Cl. .................... 235/200 PF, 137/81.5
[51] Int. Cl. .................... G06d 5/00
[50] Field of Search .................... 235/200, 201; 137/81.5

[56] References Cited
UNITED STATES PATENTS

| | | | |
|---|---|---|---|
| 3,155,825 | 11/1964 | Boothe | 235/201 PF |
| 3,366,327 | 1/1968 | Ringwall et al. | 235/200 PF |
| 3,443,574 | 5/1969 | Posingies | 137/81.5 |
| 3,458,129 | 7/1969 | Woodson | 235/200 PF |
| 3,503,423 | 3/1970 | Edell | 235/201 X |
| 3,516,605 | 6/1970 | Rexford | 235/200 |

*Primary Examiner*—Richard B. Wilkinson
*Assistant Examiner*—Lawrence R. Franklin
*Attorneys*—Frank L. Neuhauser, Oscar B. Waddell, Joseph B. Forman, Arthur E. Forneir, Jr. and David M. Schiller

ABSTRACT: The gain of a fluidic proportional integrator circuit is alternately reduced to zero to obtain a fluidic reset integrator having no moving mechanical parts. A rapid reduction to zero gain is achieved by alternately switching the output of a digital fluid amplifier from the power fluid inlet of a proportional fluid amplifier in the integrator circuit in accordance with the pressure magnitude at the output of the integrator circuit.

PATENTED JUL 13 1971 3,592,383

Figures 1, 2:
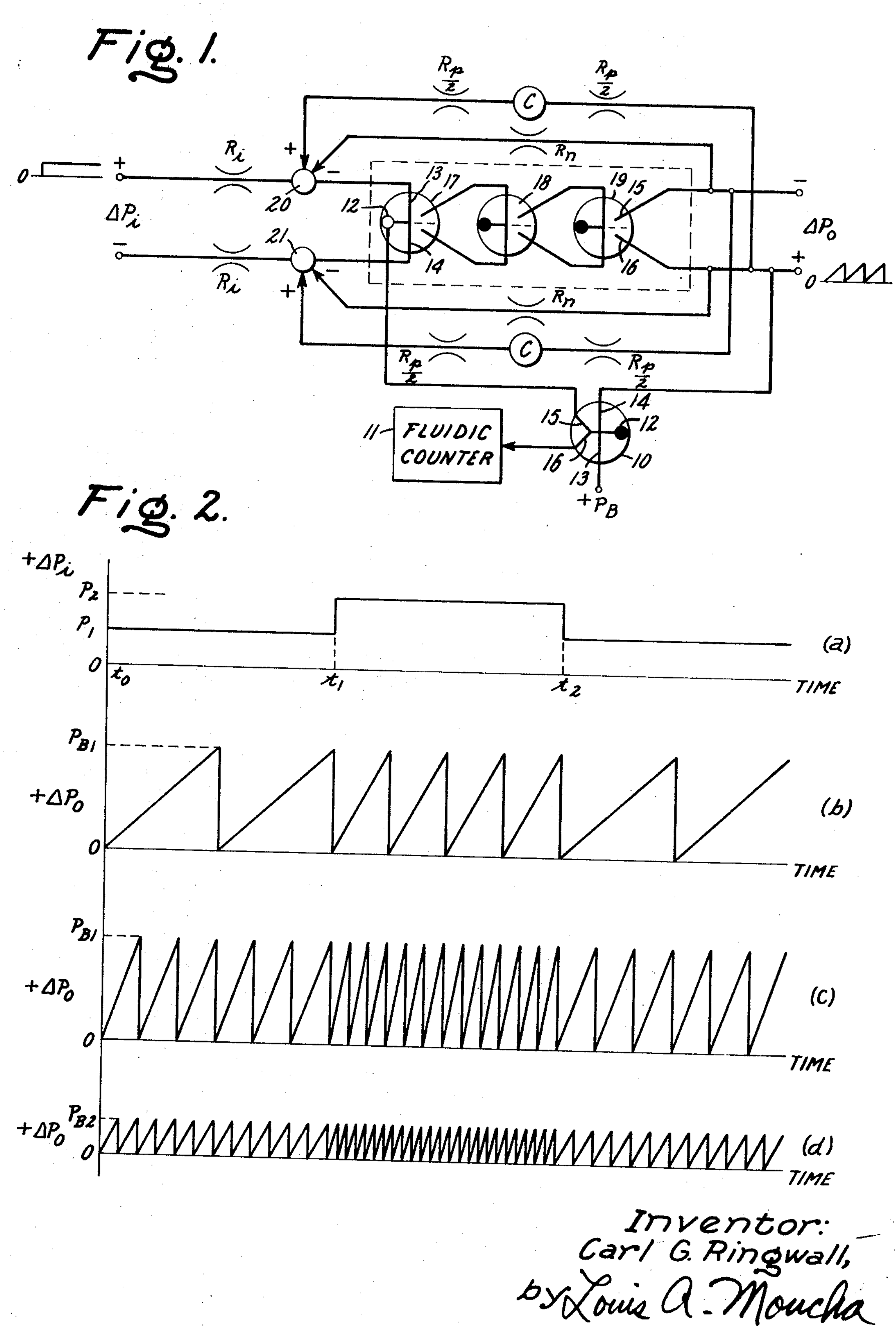

Inventor:
Carl G. Ringwall,
by Louis A. Moucha

FLUIDIC RESET INTEGRATOR CIRCUIT

FLUIDIC RESET INTEGRATOR CIRCUIT

My invention relates to a fluidic proportional integrator circuit which is repetitively resettable and in particular, to a fluidic circuit wherein the reset function is obtained by momentarily reducing the integrator circuit gain to zero.

The proportional reset integrator is a circuit component which finds application in computation and control systems. In operation, the integrator portion of the reset integrator is reset to an initial or zero state upon reaching a predetermined output level to thereby limit the operation of the active circuit elements in the integrator over their linear and most accurate range. The total number of resets can be counted and is proportional to the time integral of the input signal to the integrator.

Reset integrators are well known in the electronic art, but appear to be unknown in the fluidics art. Obviously, a fluidic reset integrator is highly desirable in fluidic computation and control systems wherein a high degree of accuracy in a mathematical integration operation is required.

Therefore, one of the principal objects of my invention is to provide a new fluidic circuit and method for performing an accurate mathematical integration function.

Another object of my invention is to provide a new fluidic reset integrator circuit having no moving mechanical parts and new method for obtaining the reset integration.

A further object of my invention is to provide a new fluidic pressure-to-frequency converter having no moving mechanical parts and new method for converting the magnitude of a fluid pressure signal to a fluid frequency signal.

Briefly stated, my invention is a circuit having no moving mechanical parts and includes a fluidic proportional integrator circuit and fluidic means for momentarily reducing the gain of the integrator to zero at a predetermined integrator output pressure level. The gain reducing means is a digital-type fluid amplifier having one control inlet thereof connected to an output of the integrator and the second control inlet connected to a constant bias pressure source which causes switching of the digital amplifier output at the predetermined integrator output pressure level. One output of the digital amplifier supplies the power fluid to a proportional fluid amplifier in the integrator circuit and the second output is connected to a fluidic counter whereby the integrator output is rapidly reduced to zero upon the digital amplifier being switched to the second output. The number of reset cycles detected by the counter is directly proportional to the time integral of a pressurized signal supplied to the input of the integrator.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawing wherein:

FIG. 1 is a schematic diagram of the reset integrator circuit constructed in accordance with my invention; and FIG. 2 illustrates a series of input and output pressure waveforms describing the operation of my circuit as a reset integrator and pressure-to-frequency converter.

Referring now in particular to FIG. 1, there is illustrated the various elements in schematic form which comprise my fluidic reset integrator circuit which is also operative as a pressure-to-frequency converter and relaxation oscillator. The fluidic integrator portion of the reset integrator includes all of the elements illustrated in FIG. 1 except a digital-type fluid amplifier 10 and a fluidic counter 11 connected to an output thereof. The integrator has sufficiently high gain such that its output versus input pressure characteristics are very linear in the nonsaturated region for a constant pressure input. The integrator is a high gain proportional-type fluidic integrator, and as one example, the illustrated embodiment is the fluidic integrator disclosed and claimed in a copending U.S. Pat. application Ser. No. 752,098 to T. F. Urbanosky entitled "High Signal-to-Noise-Fluid Amplifier and Fluidic Components," filed July 18, 1968, now U.S. Pat. No. 3,534,755 as a continuation-in-part of Ser. No. 575,092, filed Aug. 25, 1966, now abandoned, these applications being assigned to the assignee of the present invention.

Briefly, the proportional integrator includes a plurality of serially connected proportional-type fluid amplifiers shown enclosed within the dashed line in FIG. 1, and positive and negative feedback networks. Each fluid amplifier is of a conventional type and comprises a power fluid inlet 12 schematically indicated by a small circle located within the large circle defining the entire amplifier device. Each amplifier also includes a pair of opposed control fluid inlets 13, 14 and a pair of spaced fluid receivers 15, 16, located downstream of the power fluid inlet and comprising the outputs of the fluid amplifier device. For illustrative purposes only, the integrator includes three serially connected proportional fluid amplifiers 17, 18 and 19. It should be understood that the integrator may comprise any number of amplifiers, the criteria being that the assembled integrator have a sufficiently high gain such that a very linear output versus input pressure characteristic in the nonsaturated region is obtained for a constant pressure input signal. A differential pressurized input signal $\Delta P_i$ being integrated by my circuit is supplied to input ends of a pair of fluid flow passages including fluid flow restrictors $R_i$. The output ends of the passages are connected to a pair of summing junctions 20, 21 at the input to first stage amplifier 17. The negative feedback networks comprise two passages including restrictors $R_n$, and are connected from the output of the last stage amplifier 19 to the input summing junctions 20, 21. The resistive negative feedback network converts the plurality of serially connected amplifiers 17, 18, 19 to a fluidic proportional operational amplifier having a closed loop gain determined approximately by the relationship $R_n/R_i$. Finally, the positive feedback networks comprise two passages also connected from the output of the last stage amplifier to the input summing junctions, and function to convert the fluidic operational amplifier to a fluidic proportional integrator. The positive feedback passages include fluid flow restrictive-reactive networks for determining the integrating time constant. As illustrated in FIG. 1, the restrictive-reactive ($Rp/2$-C-$Rp/2$) networks may be of the R-C (resistance-capacitance) time constant type, or alternatively (and not shown), of the L-R (inductance-resistance) time constant type. The capacitive-type fluidic reactor illustrated in FIG. 1, and designated C, is a fixed volume whereas the inductive-type fluidic reactor is a long length tubing. The split restrictors $Rp/2$ provide a low input impedance to first stage amplifier 17 to obtain a faster R-C discharge for the resetting operation.

The integrator is adapted for operation with single-sided or push-pull pressure signals, but for simplification, only the push-pull (differential pressure) signal operation will be described herein. The various signals in my fluidic integrator are transmitted from the output (receivers) of one amplifier to the input (control fluid inlets) of another by suitable fluid flow passage which may comprise slots through selected laminates or a plurality of aligned apertures therein, as disclosed in the copending Urbanosky application, or may comprise any other suitable passages such as tubing. The differential pressurized output $\Delta P_o$ of the integrator varies as the time integral of the input signal $P_i$. The integrator output versus input pressure characteristics are more linear over a greater output pressure range with increased gain of the integrator. However, the analog integrator is limited in operation to finite integrating times due to the natural saturating characteristics of proportional-type fluid amplifiers. Thus, a more accurate integration is obtained by operating the fluid amplifiers always in their linear region, that is, below saturation. Although the output versus constant pressure input characteristics of the integrator are fairly linear below saturation, the integration accuracy can be further improved by always operating each proportional amplifier in the integrator in a pressure range well below its saturation level. One means of achieving this integrator operation below a predetermined output pressure limit will now be illustrated in accordance with my invention.

A fluidic proportional integrator can be limited in operation to its linear and most accurate range by converting the integrator to a reset integrator, that is, resetting the integrator to an initial output state when the integrator output has risen to some predetermined pressure less than the saturated level. The total number of resets over a particular interval of time is then proportional to the mathematical time integral of the input signal, and this total number is obtained by counting the reset cycles. For this purpose, fluidic counter 9 is connected to receiver 16 of digital amplifier 10. The resetting function may be accomplished by various means producing the desired result of suddenly reducing the integrator output to an initial state which conveniently may be a zero output. Basically, the reset function is achieved by suddenly reducing the integrator gain to zero, and this gain reduction is obtained by opening the integrator circuit at some point, or shorting the control fluid inlets of one of the proportional fluid amplifiers in the integrator. Since an object of my invention is to provide a circuit having no moving mechanical parts, the reset function herein is achieved by utilizing the switching characteristics of a conventional digital-type fluid amplifier to suddenly remove the power fluid supply to one of the proportional amplifiers in the integrator at a predetermined integrator output pressure level. In particular, digital fluid amplifier 10 supplies the power fluid to the first stage proportional amplifier 17 during the integration function, and suddenly removes such supply during the reset function which thereby suddenly reduces the integrator gain to zero to cause the integrator output pressure $\Delta P_o$ to drop to zero. Although the removal of the power fluid supply to any of the serially connected amplifiers 17, 18, 19 will result in the integrator zero state condition, it is preferable to remove such power fluid from the first stage amplifier 17 to reduce the discharge time constant of the restrictive-reactive networks in the integrator feedback, thereby decreasing the reset time. Digital amplifier 10 is a conventional bistable-type device comprising a power fluid inlet, a pair of opposed control fluid inlets, a pair of fluid receivers downstream of the power fluid inlet, and an interaction chamber disposed between the control fluid inlets and receivers and including a pair of opposed sidewalls which are adapted to cause a lock-on condition of the power fluid jet thereon. The digital amplifier power fluid is directed to only one receiver at any one time, and is maintained in such condition until an appropriate control fluid signal causes the power fluid jet to switch to the opposite sidewall and receiver associated therewith. The power fluid inlet of digital amplifier 10 is constantly supplied from a source of relatively constant pressurized fluid, as are all the proportional amplifiers 18, 19, in the integrator except for the first stage 17. This continuous supply of power fluid during operation of the reset integrator is indicated in FIG. 1 by the filled-in power fluid inlet circles 12 as distinguished from the empty circle 12 in the first stage amplifier 17. A first receiver 15 of digital amplifier 10 is connected by means of a passage to the power fluid inlet 12 of first stage proportional amplifier 17 in the integrator and supplies the power fluid thereto. A conventional fluidic counter 11 is connected to the second receiver 16 of digital amplifier 10 and comprises the final element of my reset integrator. The control fluid inlet 13 on the opposite side of the centerline axis of digital amplifier 10 from receiver 15 is supplied from a source of constant pressurized fluid designated $P_B$ which establishes the integrator output pressure $\Delta P_o$ level at which the digital amplifier output switches from one receiver to the other. The second control fluid inlet 14 of digital amplifier 10 is connected to an output of the integrator to permit digital amplifier 10 to sense the magnitude of the output pressure signal $\Delta P_o$.

The operation of my fluidic reset integrator will now be described with reference to the circuit elements illustrated in FIG. 1 and the pressure waveforms illustrated in FIG. 2. For exemplary purposes, the input signal $\Delta P_i$ supplied to the input terminals of the reset integrator is a differential pressurized signal having a magnitude and polarity at the positive (+) input terminal relative to the negative (−) input terminal as illustrated in the FIG. 2(*a*) waveform. Thus, input signal $\Delta P_i$ comprises a constant low-pressure amplitude $P_1$ over the time interval $t_0$ to $t_1$, a constant high-pressure amplitude $P_2$ (where $P_2 = 2P_1$) over the time interval $t_1$ to $t_2$, and the constant low-pressure amplitude $P_1$ for a time period after $t_2$. Since the time integral of a constant is equal to such constant times the time over which the integration is performed $\int_{t_0}^{t_1} P_1 dt = P_1(t-t_2)$, it can be appreciated that in response to input signal $\Delta P_i$, the output waveform $\Delta P_o$ is a series of ramps or sawtooths as illustrated in FIG. 2(*b*) having a frequency directly proportional to the magnitude of the input signal $P_i$. Thus, the frequency of the output waveform $\Delta P_o$ during time interval $t_1$ to $t_2$ is twice the frequency of that in time interval $t_0$ to $t_1$ wherein pressure $P_1$ is half the amplitude of pressure $P_2$. Each cycle of the output sawtooth waveform $\Delta P_o$ rises linearly to a maximum pressure level $P_{B1}$ which is substantially equal to digital amplifier bias pressure $P_B$. During this linearly rising portion of each cycle of the $\Delta P_o$ waveform, the bias pressure $P_B$ exceeds the integrator output pressure $\Delta P_o$ supplied to the control fluid inlet 14 of digital amplifier 10, and thus the digital amplifier output is constantly supplied to power fluid inlet 12 of the first stage proportional amplifier 17. At the time each cycle of the output pressure waveform $\Delta P_o$ or very slightly exceeds bias pressure $P_B$(i.e., at each peak of the $\Delta P_o$ waveform), the output of digital amplifier 10 is switched from receiver 15 to receiver 16, thereby suddenly removing the power fluid supply to first stage proportional amplifier 17 and reducing the gain of the three-stage integrator to zero. The sudden reduction of integrator gain to zero causes the integrator output pressure $\Delta P_o$ to suddenly drop to zero as indicated by the trailing edge of each cycle in the waveform. Immediately upon the integrator output pressure $\Delta P_o$ being reduced to zero, digital amplifier 10 switches its output from receiver 16 back to 15 due to constantly applied bias pressure $P_B$, first stage proportional amplifier 17 is again supplied with power fluid, the integrator regains its normal gain and commences integrating again to provide another cycle of linearly rising output pressure $\Delta P_o$ in response to the constant input signal $\Delta P_i$. The increased (double) magnitude of the input signal $\Delta P_i$ during time interval $t_1$ to $t_2$ causes the rate of rise of the output pressure $\Delta P_o$ to be twice as great, resulting in the double frequency output during such time interval.

The natural integrating time constant of the integrator is $R_pC/4$ as determined by the positive feedback loop fluid flow restrictive-reactive elements. This feedback time constant is multiplied by the integrator open loop gain (GH) in the case of the integrator being formed by an L-R network in a negative feedback loop (not shown), and is multiplied by 1/1-GH in the case of the integrator being formed by the R-C network in the positive feedback loop as illustrated to obtain the actual integrating time constant. In both these cases, the multiplying factor is directly proportional to the forward gain of the serially connected amplifiers 17, 18 and 19. The larger actual integrating time constant results in an increased period of integration in each cycle. The integrating rate or gain of the integrator, as described in the aforementioned copending U. S. Pat. application Ser. No. 752,098 to Urbanosky is $R_n/R_i\tau$ where $\tau$ is the actual integrating time constant. Thus, the gain and integrating time constant of the integrator can be varied by varying any one of the pair of restrictors $R_i$, $R_n$, $R_p$ or capacitors $C$, although as a practical matter, gain is generally varied by varying restrictors $R_n$ or $R_i$, and the integrating time constant is generally varied by varying either capacitors $C$ or restrictors $R_p$ in the positive feedback network. In any event, the restrictor and reactor elements in the integrator are selected to obtain a very linear rate of rise of the output pressure for a constant input pressure signal, it being recognized that the forward gain of the multistage proportional fluid amplifiers 17, 18, 19 is an equally important factor in determining the linearity of the integration. As an example of the operating characteristics of my reset integrator, the ratio of the integration time constant to the time required to reset would be on the order of 25 to one.

My reset integrator is thus based on a method for multiplying a (integrating) time constant by the gain of an amplifier to thereby increase the period of integration in each cycle, and for reducing the gain to zero at a predetermined triggering level which determines the reset time. The performance of the reset integrator is improved with additional stages of proportional amplification and with increased negative feedback which improves the linearity of the output $\Delta P_o$ as well as increasing the period of each integrating cycle.

In the case of a constant magnitude input signal $\Delta P_i$, my reset integrator may also be utilized as a fluidic timer or relaxation oscillator for generating short or long duration timing intervals, that is, the output $\Delta P_o$ is a sawtooth waveform of constant period. An adjustable timing interval of up to 60 seconds for a single cycle may be obtained.

A further application of my invention is its use as a pressure-to-frequency (P-F) converter. It can be appreciated from a comparison of the waveforms in FIGS. 2*a* and 2*b* that the frequency of the output waveform $\Delta P_o$ is directly proportional to the magnitude of the input signal $\Delta P_i$. In the reset integrator application illustrated in FIG. 2*b*, the time constant network in the positive feedback loop is selected to obtain a relatively low frequency of the output waveform $\Delta P_o$ since the reset cycles are accumulated in a counter with finite storage capacity and typical operating times would be of long duration. In the application of the circuit of FIG. 1 as a P-F converter, the integrating time constant network is selected to provide a substantially higher frequency in the output waveform as illustrated in FIG. 2*c* in order to obtain a more sensitive converter. Thus, it is evident from the comparison of the output $\Delta P_o$ waveforms in FIGS. 2*b* and 2*c* that a readout of the fluidic counter in the case of the FIG. 2*c* waveform more readily distinguishes between small changes in the magnitude of the input signal $\Delta P_i$. In the case of the P-F converter having the input-output characteristics illustrated in FIGS. 2*a* and 2*c*, the bias pressure $P_B$ supplied to digital amplifier 10 is at the same pressure magnitude $P_{B1}$ as for the reset integrator indicated in the FIG. 2*b* waveform. An even more sensitive P-B converter is obtained by reducing the bias pressure $P_B$ to a lower pressure magnitude $P_{B2}$ as indicated in the output waveform in FIG. 2*d* to thereby reduce the triggering pressure level at which reset occurs and thus increase the frequency of the output waveform for a given input pressure $\Delta P_i$. The lower maximum output level of the integrator in the FIG. 2*d* mode of operation, as compared to the FIG. 2*c* operation, also results in an even greater linearity of integrator operation. It should be obvious that not only may the bias pressure $P_B$ be varied for purposes of varying the frequency of the output waveform relative to a constant input signal, but the output waveform frequency may also be varied by varying the gain of the integrator or operational amplifier to thereby vary the slope or rate of rise of the integrating output waveform $\Delta P_o$.

Typical operating characteristics for my reset integrator and P-*f* converter are the following a. Reset integrator application:

One reset every 10 seconds for 0.2 p.s.i. differential input.

b. P-*f* converter application:

One reset every 0.05 second for 0.2 p.s.i. differential input.

In view of the foregoing description, it is believed that the objects of my invention have been clearly attained. In particular, I have provided a new fluidic circuit and method for performing the mathematical integration function wherein the number of resets registered on a fluidic counter is directly proportional to the time integral of the input. My circuit can also be utilized as a pressure-to-frequency converter and relaxation oscillator wherein the frequency of the output waveform is directly proportional to the pressure magnitude of the input signal. The resetting means for my fluidic circuit is one of the most important features of my invention and is achieved by momentarily removing the power fluid supply to the first stage proportional amplifier in the operational amplifier portion of the integrator. This momentary removal of the power fluid supply momentarily reduces the gain of the integrator to zero to obtain the reset function. All of the fluidic components herein described have no moving mechanical parts to thereby obtain a circuit relatively simple in design, inexpensive in fabrication, capable of withstanding extreme environmental conditions such as shock, vibration, nuclear radiation and high temperature, and the no-moving parts feature permits substantially unlimited lifetime thereby achieving long periods of uninterrupted operation.

What I claim as new and desire to secure by Letters Patent of the United States is:

1. A fluidic reset integrator circuit having no moving mechanical parts and comprising
   - a plurality of serially connected proportional type fluid amplifier stages, each proportional amplifier comprising
     - a power fluid inlet,
     - a pair of opposed control fluid inlets, and
     - a pair of spaced fluid receivers,
   - the fluid receivers of each amplifier stage except the last being connected to the control fluid inlets of the immediately succeeding amplifier stage,
   - a first pair of fluid flow passages connecting the fluid receivers of the last stage amplifier to the control fluid inlets of the first stage amplifier in negative feedback relationship, and a first pair of fluid flow restrictors connected in said first pair of passages for converting the serially connected fluid amplifiers into a fluidic operational amplifier,
   - a second pair of fluid flow passages connecting the fluid receivers of the last stage amplifier to the control fluid inlets of the first stage amplifier in positive feedback relationship, and a pair of fluid flow restrictor-reactor networks connected in said second pair of passages for converting the fluidic operational amplifier into a fluidic integrator whereby the output pressure at the receivers of the last stage amplifier varies as the time integral of an input pressure signal supplied from an external source to the control fluid inlets of the first stage amplifier, and
   - means for momentarily reducing the gain of the fluidic integrator to zero upon the last stage amplifier attaining a predetermined output pressure below its saturation level to thereby rapidly reduce the output pressure of each stage amplifier to zero at which time the gain of the fluidic integrator returns to its original value and the integration resumes, the output pressure waveform of the last stage amplifier being a repetitive sawtooth.

2. A The fluidic reset integrator circuit set forth in claim 1 wherein
   - the power fluid inlets of all but one of the plurality of serially connected proportional fluid amplifiers being constantly supplied from a source of relatively constant pressurized fluid, and
   - said gain-reducing means comprising a means for alternately supplying and removing pressurized fluid from the power fluid inlet of the remaining fluid amplifier whereby during the time interval wherein the pressurized fluid is removed from the power fluid inlet of the remaining amplifier, the gain of the fluid integrator circuit is zero and the output pressure of the last stage amplifier thereby reduces to zero.

3. The fluidic reset integrator circuit set forth in claim 2 wherein
   - said alternately supplying and removing pressurized power fluid means comprises a digital-type fluid amplifier comprising
     - a power fluid inlet,
     - a pair of opposed control fluid inlets,
     - a pair of fluid receivers, and
     - an interaction chamber including a pair of opposed sidewalls disposed between the control fluid inlets and receivers, said sidewalls adapted to cause a lock-on condition of a power fluid jet issuing from an output end of the power fluid inlet whereby the power fluid jet is directed to only one receiver at any one time.

4. The fluidic reset integrator circuit set forth in claim 3 wherein a first of the pair of control fluid inlets of said digital-type fluid amplifier connected to a first of the pair of receivers of the last stage analog amplifier, a second of the control fluid inlets of said digital amplifier connected to a source of constant pressure for providing a bias pressure to determine the switching point of the output of said digital amplifier, and a first of the pair of receivers of said digital amplifier connected to the input end of the power fluid inlet of the first stage analog amplifier for supplying the power fluid thereto in the condition wherein the bias pressure exceeds the output pressure at the first of the pair of receivers of the last stage analog amplifier.

5. The fluidic reset integrator circuit set forth in claim 4 and further comprising means connected to a second of the pair of receivers of said digital amplifier for sensing each cycle of the repetitive sawtooth output pressure waveform.

6. A fluidic circuit comprising at least one proportional-type fluid amplifier comprising a power fluid inlet, a pair of opposed control fluid inlets, and a pair of spaced fluid receivers, a first pair of fluid flow passages connecting the fluid receivers to the control fluid inlets in negative feedback relationship, and a first pair of fluid flow restrictors connected in said first pair of passages for converting the proportional amplifier into a fluidic proportional operational amplifier, a second pair of fluid flow passages connecting the fluid receivers to the control fluid inlets in positive feedback relationship, and a pair of fluid flow restrictor-reactor networks connected in said second pair of passages for converting the operational amplifier into a fluidic proportional integrator whereby an output pressure at the receivers of the amplifier varies as the time integral of an input pressure signal supplied from an external source to the control fluid inlets, and means for momentarily reducing the gain of the fluidic integrator to zero upon the proportional amplifier attaining a predetermined output pressure in the linear region of the input-output pressure characteristics of the amplifier operation to thereby momentarily reduce the output pressure to zero whereupon the gain of the fluidic integrator returns to its original value and the integration resumes, the output pressure waveform being a repetitive sawtooth.

7. The fluidic circuit set forth in claim 6 wherein said gain-reducing means comprises a means for alternately supplying and momentarily removing a pressurized fluid supply to the power fluid inlet of at least one of said at least one proportional fluid amplifier, the gain of the integrator being momentarily reduced to zero upon the momentary removal of the power fluid supply.

8. The fluidic circuit set forth in claim 7 wherein said alternately supplying and momentarily removing pressurized fluid supply means comprises a digital-type fluid amplifier.

9. The fluidic circuit set forth in claim 8 wherein said digital fluid amplifier comprises a power fluid inlet constantly supplied from a source of relatively constant pressurized fluid, a pair of opposed control fluid inlets, a first of said control fluid inlets connected to a first of the pair of receivers of said proportional fluid amplifier, a second of said control fluid inlets connected to a source of constant pressure for providing a bias pressure determining the switching point of the output of said digital amplifier, a pair of fluid receivers, a first of the pair of receivers connected to an input end of the power fluid inlet of the proportional amplifier for supplying the power fluid thereto in the condition wherein the bias pressure exceeds the output pressure at the first of the receivers of said proportional amplifier.

10. The fluidic circuit set forth in claim 9 and further comprising means for sensing each cycle of the repetitive sawtooth output pressure waveform, the frequency of the sawtooth waveform being directly proportional to the pressure magnitude of the input signal supplied to the control fluid inlets of said proportional amplifier whereby the fluidic circuit is operative as a fluidic pressure-to-frequency converter.

11. The fluidic circuit set forth in claim 9 and further comprising means for counting the total number of cycles of the repetitive sawtooth output pressure waveform generated over a particular time interval wherein the total number of cycles are directly proportional to the integral of the input signal supplied to the control fluid inlets of said proportional amplifier over the corresponding time interval and the fluidic circuit is operative as a fluidic proportional integrator.

12. The fluidic circuit set forth in claim 9 wherein the input signal supplied to the control fluid inlets of said proportional amplifier is of constant pressure magnitude, the frequency of the sawtooth waveform being constant and directly proportional to the pressure magnitude of the input signal whereby the fluidic circuit is operative as a fluidic relaxation oscillator.